(12) United States Patent
Liu

(10) Patent No.: US 12,153,333 B2
(45) Date of Patent: Nov. 26, 2024

(54) MULTI-FUNCTIONAL MOUNT FOR WEBCAM

(71) Applicant: MAGIC CONTROL TECHNOLOGY CORPORATION, New Taipei (TW)

(72) Inventor: Pei-Chung Liu, New Taipei (TW)

(73) Assignee: Magic Control Technology Corporation, New Taipei (TW)

( * ) Notice: Subject to any disclaimer, the term of this patent is extended or adjusted under 35 U.S.C. 154(b) by 129 days.

(21) Appl. No.: 18/089,074

(22) Filed: Dec. 27, 2022

(65) Prior Publication Data

US 2024/0118592 A1 Apr. 11, 2024

(30) Foreign Application Priority Data

Oct. 7, 2022 (TW) .................................. 111138302

(51) Int. Cl.
*G03B 17/56* (2021.01)
*F16M 11/04* (2006.01)

(52) U.S. Cl.
CPC ........... *G03B 17/561* (2013.01); *F16M 11/04* (2013.01)

(58) Field of Classification Search
CPC ...... G03B 17/561; G03B 17/04; F16M 11/04; G06F 1/1607
See application file for complete search history.

(56) References Cited

U.S. PATENT DOCUMENTS

| 6,663,066 B1 | 12/2003 | Hong |
| 8,475,059 B2 | 7/2013 | Khamsepoor et al. |
| 9,169,962 B2 | 10/2015 | Wang et al. |
| 9,323,135 B1* | 4/2016 | Veloso ................... F16M 13/00 |
| 2009/0095871 A1 | 4/2009 | Xiao et al. |
| 2010/0084529 A1 | 4/2010 | Depay et al. |
| 2013/0284879 A1* | 10/2013 | Low ..................... G03B 17/561 248/558 |
| 2019/0281198 A1 | 9/2019 | Michaelian et al. |
| 2020/0389574 A1* | 12/2020 | Chang ................ F16M 11/2035 |

(Continued)

FOREIGN PATENT DOCUMENTS

| CN | 111221204 A | 6/2020 |
| CN | 111329520 A | 6/2020 |

(Continued)

OTHER PUBLICATIONS

European search Report of European Application No. 22212985.0-1020.

(Continued)

*Primary Examiner* — Christopher E Mahoney
(74) *Attorney, Agent, or Firm* — Millen, White, Zelano & Branigan P.C.; Wan-Ching Montfort

(57) ABSTRACT

Provided is a multi-functional mount for a webcam for installing the webcam on a computer display, and the webcam set on the mount is movable in a horizontal direction to an appropriate distance beyond the display and then rotated 90°, so that a camera lens of the webcam can be vertically oriented downward to capture an image on a table. The mount further includes a counterweight block, which is rotatable to adjust for obtaining the best position to balance the two ends of the mount and prevent the mount from tipping over the computer display. The mount can also be placed directly on a table with a combination of a plurality of base body bodies.

6 Claims, 11 Drawing Sheets

(56) References Cited

U.S. PATENT DOCUMENTS

| | | | |
|---|---|---|---|
| 2022/0235898 A1* | 7/2022 | Wang | F16M 11/121 |
| 2023/0262304 A1* | 8/2023 | Kanter | G06F 1/1607 |
| | | | 348/373 |

FOREIGN PATENT DOCUMENTS

| | | |
|---|---|---|
| CN | 112119256 A | 12/2020 |
| CN | 213177396 U | 5/2021 |
| TW | M352615 U | 3/2009 |
| TW | 111123291 | 6/2022 |

OTHER PUBLICATIONS

First Office Action in corresponding TW111138302 dated Mar. 20, 2023 (pp. 1-7).

\* cited by examiner

MULTI-FUNCTIONAL MOUNT FOR WEBCAM

CROSS-REFERENCE TO RELATED APPLICATION

This application claims the priority of Taiwanese patent application No. 111138302, filed on Oct. 7, 2022, which is incorporated herewith by reference.

BACKGROUND OF THE INVENTION

1. Field of the Invention

The present invention relates generally to a mount for a webcam of the field of accessories for communication electronic equipment, and more particularly, to a mount for a webcam, with adjustable center of gravity according to the position mounted on the computer display.

2. The Prior Arts

The use of webcams for visual communication has become a common method in the era of Internet development. Although some known computer displays have built-in cameras, the built-in cameras are all fixedly installed on the side facing the user, i.e., displaying the face of the user. The user cannot easily adjust the direction of the camera to obtain images. To solve this problem, a common choice is to purchase an additional webcam to mount on the display.

The mount for a conventional webcam has a base body for fixing on the upper side of the display, and the base body is provided with a movable base body that is rotatable, so that the webcam installed on the movable base body can, in addition to looking directly at the user, also rotate to adjust the viewing angle and the top view angle, as disclosed in related prior art documents such as U.S. Pat. Nos. 8,475,059 and 9,169,962.

As shown in FIG. 1, the mount for the conventional webcam provides the webcam with rotatability to adjust the view angles through the movable base body to obtain the target image on a table; however, when it is necessary to make the webcam directly face the documents on the table to obtain good quality images, even though the webcam can be rotated 90° by the movable base body to make the lens directly face the table, the edge of the lens of the webcam C is very close to the top of the display because the mounting of the conventional webcam at the mounting base body B is installed on the top of the display D. Therefore, when the lens of the webcam faces the table directly, the lens of the webcam will still capture a part of the screen of the display, which will affect the image quality. To avoid the above, the user must rotate the movable base body back to an appropriate angle, which results in the lens of the webcam not completely facing the table directly. As such, an included angle formed between the horizontal plane of the table and the direction of the lens will not be a right angle, thereby resulting in a trapezoidal image in the captured image, which must be corrected in post-production to obtain good quality images.

The Taiwan Patent Application No. 111123291 filed by the present applicant is to solve the problem that the conventional mount used for webcam cannot rotate the webcam to an angle vertical to a table to capture images on the table without capturing part of the computer display screen at the same time, or the image captured when not facing the table vertically produces a distorted image. It is characterized by moving the webcam installed on the mount to an appropriate distance beyond the computer display in the horizontal direction and then rotating it by 90°, so that the lens of the webcam is vertically oriented downward to obtain the image on the table, avoiding the problems of incapability to capture images on the table without capturing part of the computer display screen at the same time, or the image captured is a distorted image.

However, when the webcam installed by the mount on the computer display moves to a distance beyond the front of the display in the horizontal direction, a leverage effect takes place, which may cause the mount and the webcam to fall forward. Moreover, a conventional webcam mount unable to move horizontally may have the same leverage effect as the webcam's center of gravity changes after the webcam is rotated 90°, causing the webcam to fall forward. In addition, neither the aforementioned application No. 111123291 nor the conventional webcam mount can be directly placed on the table or a horizontally flat surface to mount the webcam.

SUMMARY OF THE INVENTION

A primary objective of the present invention is to solve the problem that the known mount used for the webcam, when the webcam mounted herein is rotated by an angle or moved horizontally in front of the display, a lever effect takes place due to the change of the center of gravity, which causes a problem of tipping over the webcam.

Another objective of the present invention is to provide a mount for a webcam that can be placed on a table directly.

The present invention provides a multi-functional mount for a webcam, which comprises: a first base body; a second base body, rotatably connected to the first base body; a third base body, matched with and assembled on the second base body; and a fourth base body, for connecting a webcam and rotatably connected to the third base body; wherein, the first base body is provided with a counterweight block, making the weight of the first base body greater than the weight of any one of the second base body, the third base body, and the fourth base body; the rotatable junction between the first base body and the second base body is further rotatably connected a fifth base body so that the fifth base body is located between the first base body and the second base body. As such, when the mount is mounted on the computer display and the webcam set on the mount changes the position of center of gravity as the fourth base body rotates, the rotation angle of the first base body with the counterweight block can be rotated and adjusted at the opposite end of the mount at the same time so as to balance and stabilize the mount by changing the position of the center of gravity of the first base body. In addition, the mount can also directly use the first base body and the fifth base body to support the mount on the table for use.

According to an embodiment of the present invention, the first base body includes: a lower shell, having an inner space, and a convex column being formed on bottom surface of the inner space; and an upper shell, matched with the lower shell to cover the inner space; wherein, the counterweight block has a perforation, the counterweight is disposed in the inner space of the lower shell, and a protruding post passing through the perforation to position the counterweight block.

In an embodiment of the present invention, a free end of the fifth base body opposite to its rotatable junction is formed as an arc edge. Thereby, when the mount is disposed on the display and the arc-shaped free end of the fifth base body is abutted against the display, a more stable support can be obtained.

An embodiment of the present invention further includes: a cable organizer connected to the side of the rotatable junction of the first base body, the cable organizer having a wire hole through which a power supply cable passes. As such, the user can route the webcam's wires through the wire hole to avoid wire cluttering.

In an embodiment of the present invention, one side of the lower shell is provided with a first pivot hole; one side of the second base body is provided with a second pivot hole; one side of the fifth base body is provided with a fifth pivot hole, the second pivot hole and the first pivot hole complete the rotatable junction through a pivot shaft; and the cable organizer has a main body and a shaft portion connected to the main body, the shaft portion is assembled in the first pivot hole in an interference fit, and the wire hole penetrates the main body radially, with an opening formed at the end of the main body and communicating with the wire hole.

In an embodiment of the present invention, the third base body is slidably matched and assembled to the second base body, the third base body slides relative to the second base body so that at least a part of the third base body is accommodated inside the second base body, or a part of the third base body extends out of the second base body; and the fourth base body is for connecting the webcam, the fourth base body is rotatably connected to the third base body, and the fourth base body is rotatable within the range of at least 0°-90° relative to the third base body. As such, when the target image on the table needs to be acquired directly, the third base body can slide to move the webcam away from the display, and then the fourth base body can rotate 90° to make the lens of the webcam directly facing the table to prevent the lens from capturing a part of the screen of the display.

In an embodiment of the present invention, the second base body is formed with a first notch, the opposite sides of the first notch are symmetrically formed with rail grooves respectively, and the opposite two outer sides of the third base body are symmetrically respectively formed with a slider that is slidably matched with the rail groove.

In one embodiment of the present invention, a tooth row is formed on one side surface of the rail grooves, and a convex strip is formed on one side surface of the sliders; when the sliders slides along the rail grooves, the convex strips and the tooth rows rub against each other to create a positioning effect.

In an embodiment of the present invention, the tooth row is formed on an upper surface of the rail grooves, the opposite ends of the sliders are respectively formed with a fixing portion and a sliding portion, the convex strip is formed on the upper surface of the sliding portion, the fixing portion has a plurality of fixing holes, and a plurality of fixing elements fix the slider to the third base body through the fixing holes.

In an embodiment of the present invention, an extension portion is formed at opening end of the first notch of the second base body, and an included angle is formed between the extension portion and the bottom surface of the second base body.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
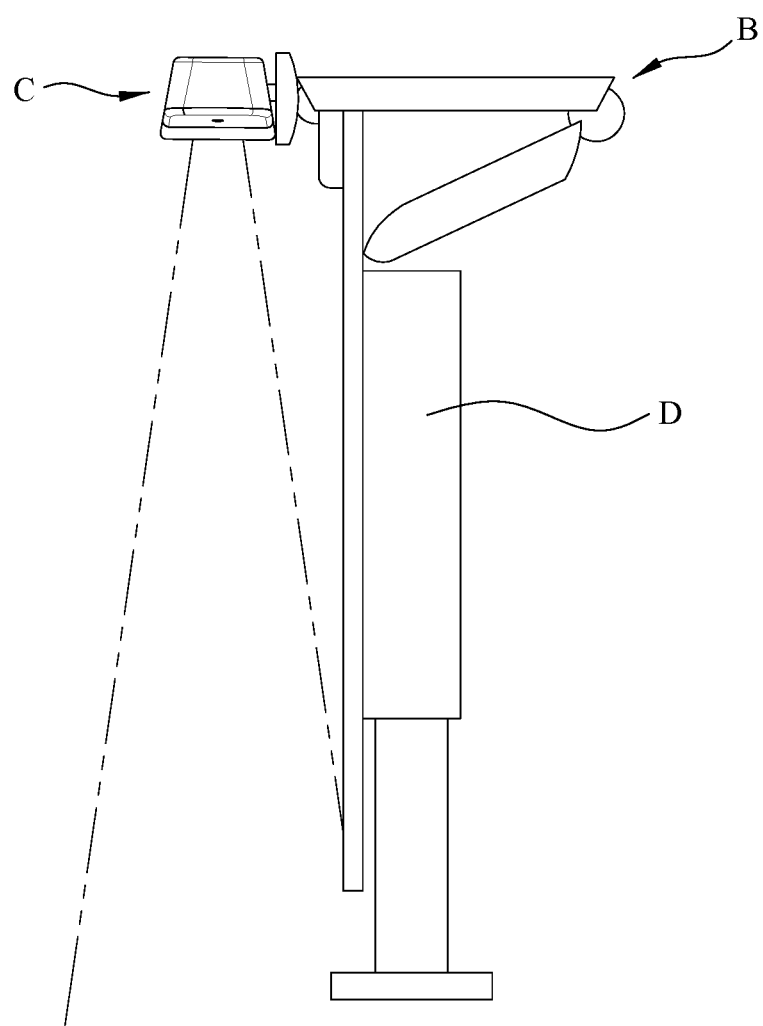
FIG. 1 is a schematic view showing the use of a conventional webcam mount mounted on a display.
Figure 2:
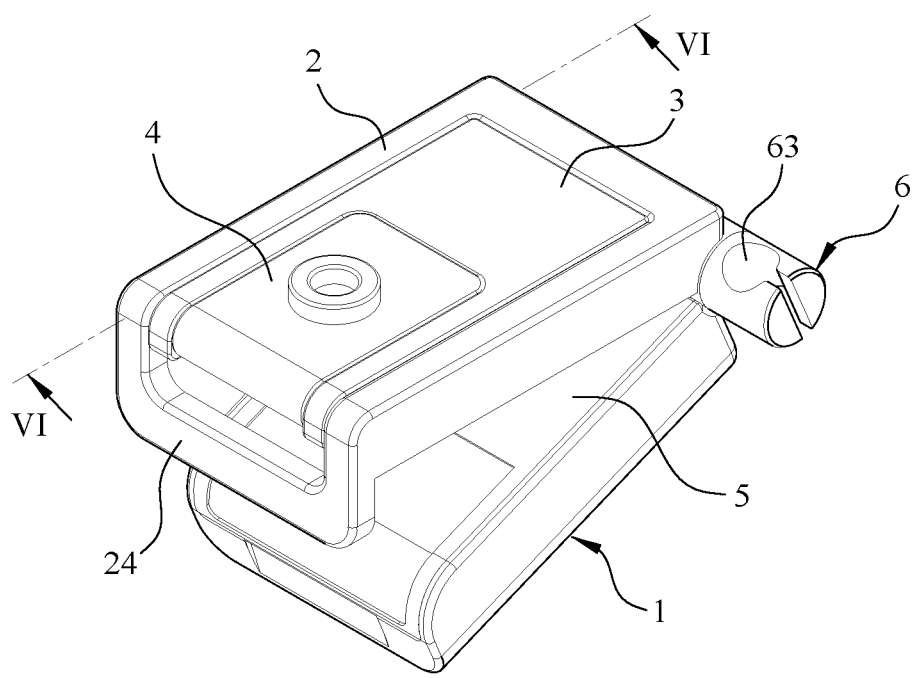
FIG. 2 is a perspective view showing the overall appearance structure of the mount for a webcam of the present invention.
Figure 3:
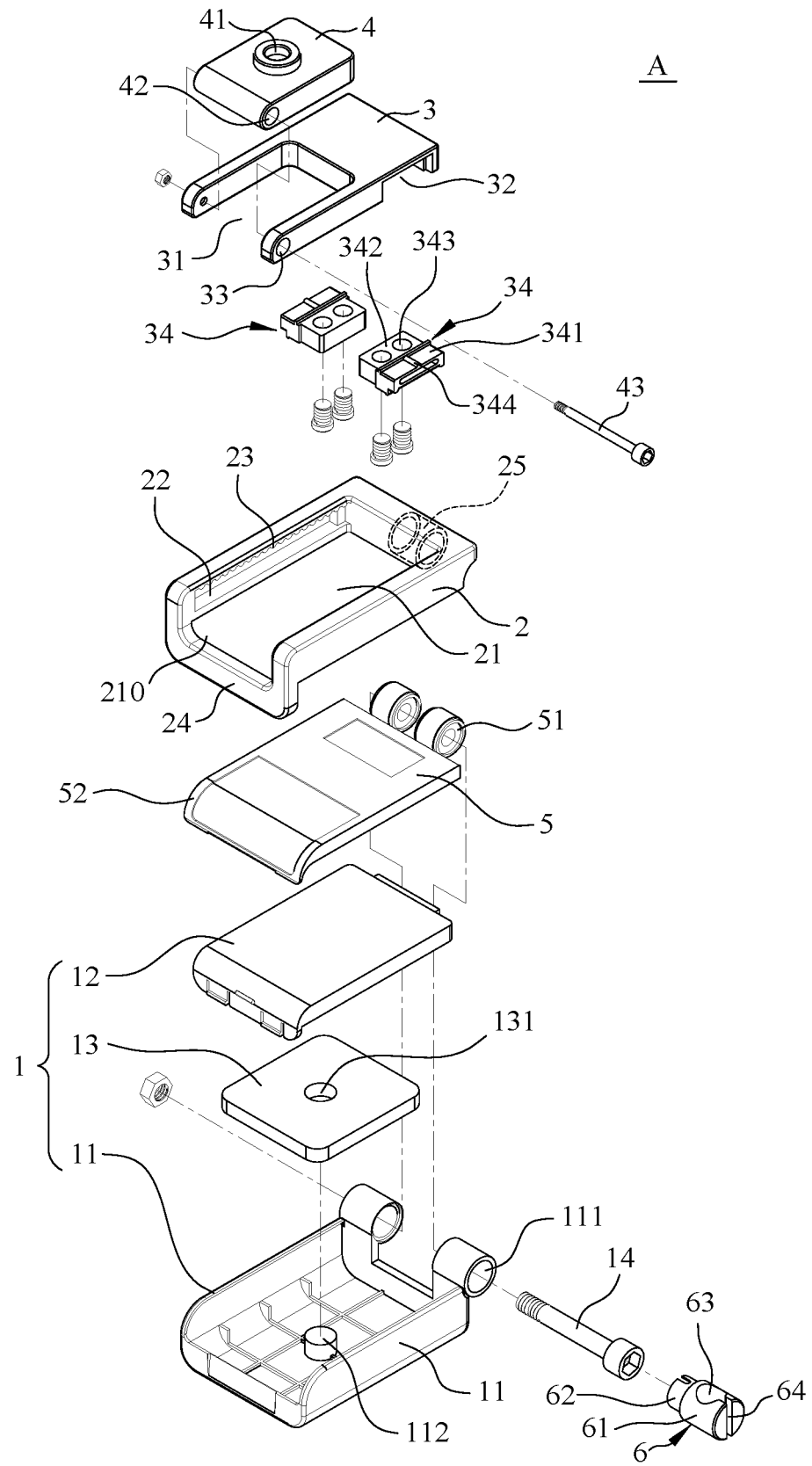
FIG. 3 is an exploded perspective view showing the assembly relationship of the main components of the mount for the webcam of the present invention.
Figure 8:
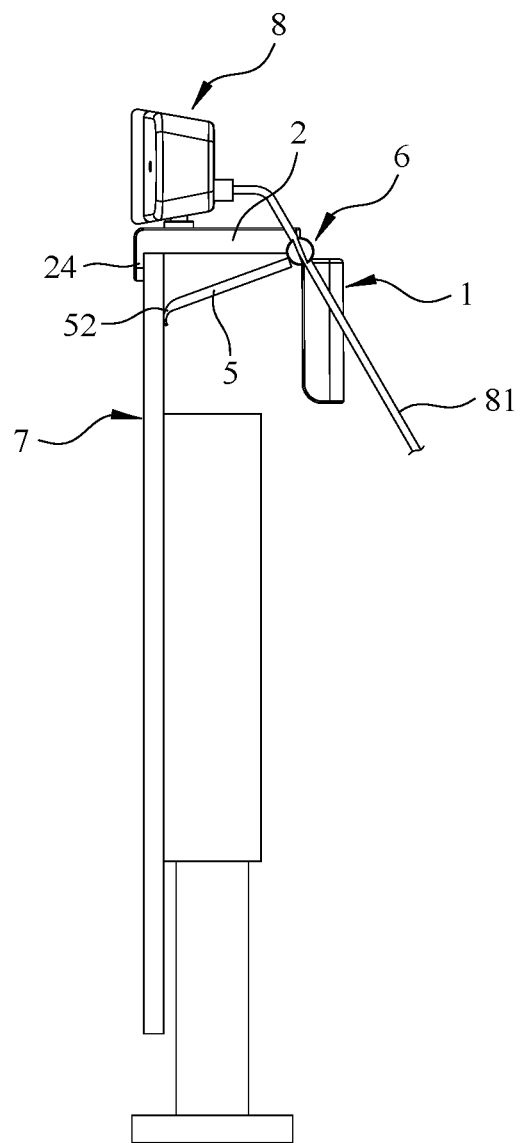
FIG. 8 is a schematic view showing the mount for the webcam of the present invention installed on the display, and the webcam installed on the mount is facing the user.

As shown in FIG. 2, FIG. 3 and FIG. 8, the embodiment of the multi-functional mount A for the webcam provided by the present invention includes: a first base body 1, a second base body 2, a third base body 3, a fourth base body 4, and a fifth base body 5; wherein, the first base body 1 is used as a counterweight element for the mount A to adjust the position of the center of gravity when the mount A is mounted on a computer display 7 (as shown in FIG. 8). One end of the first base body 1 can be set to a pivot structure that is rotatably connected with the second base body 2 and the fifth base body 5. For example, the first base body 1 may include: a lower shell 11, an upper shell 12, and a counterweight block 13. The lower shell 11 is formed with an inner space, the bottom surface of the inner space is formed with a convex column 112, and one end of the lower shell 111 is disposed with first pivot holes 111 spaced apart. The counterweight block 13 may be a metal block having a predetermined weight, the counterweight block 13 is formed with a through hole 131, and the counterweight block 13 is disposed in the inner space of the lower shell 11. The through hole 131 is penetrated by the convex column 112 to position the counterweight block 13 in the lower shell 11, and then the upper shell 12 is combined with the lower shell 11 to cover the inner space and fasten the counterweight block 13 at the same time. That is, the first base body 1 formed by the lower shell 11, the upper shell 12, and the counterweight block 13 is used as the counterweight element.

Figure 6:
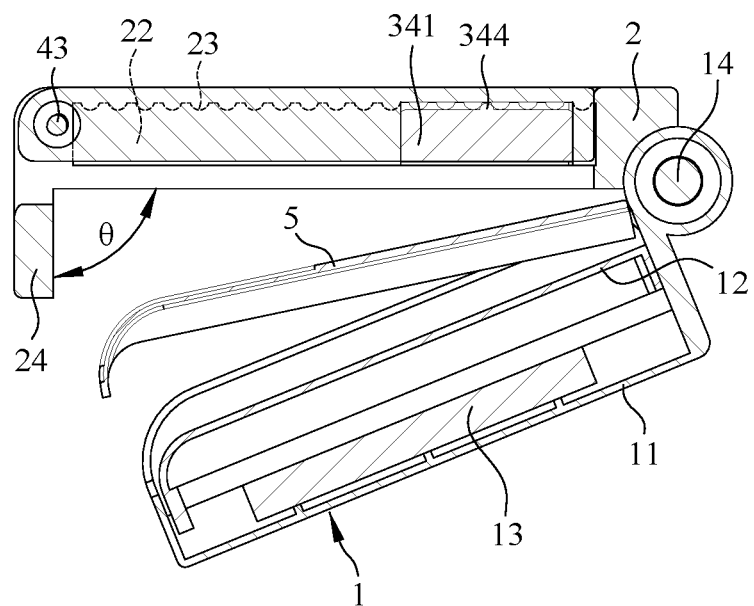
FIG. 6 is a cross-sectional view taken along line VI-VI of FIG. 2.

As shown in FIG. 3, the second base body 2 is serving as a first support element for the mount A, and the second base body 2 is rotatably connected to the first base body 1. More specifically, the second base body 2 can be integrally formed to include a first notch 21, and an extension 24 is formed to have an included angle θ with, the bottom of the second base body 2, as shown in FIG. 6. Specifically, the included angle can be formed as 90°, so that the second base body 2 is L-shaped when viewed from the side. In addition, one side of the second base body 2 is provided with a pivot structure for rotatably connecting with the first base body 1. For example, at least two second pivot holes 25 spaced apart can be provided at one end of the second base body 2. Furthermore, two horizontally extending rail grooves 22 are symmetrically formed on opposite sides of the first notch 21 of the second base body 2, and a tooth row 23 is formed on a side surface (e.g., the upper side surface) of the rail grooves 22.

As shown in FIG. 3, the fifth base body 5 serves as a second support element for the mount A, the fifth base body 5 is rotatably connected to the first base body 1 and the second base body 2, and the fifth base body 5, together with the second base body 2, supports the mounting on the upper surface of the display 7, so that the mount A is firmly placed on the display 7, as shown in FIG. 8. Specifically, the fifth base body 5 may be a thinner plate body than the first base body 1, with one end formed with a fifth pivot hole 51 and the opposite end formed as an arc-shaped side as a free end 52. The first base body 1, the second base body 2, and the fifth base body 5 are pivotally connected. When pivoting, the fifth base body 5 is first placed between the first base body 1 and the second base body 2, and the fifth pivot hole 52 is located between the two second pivot holes 25 and is axially corresponding to a first pivot hole 111 of the first base body 1; then, a pivot shaft 14 passes through the first pivot hole 111, the second pivot holes 25, and the fifth pivot hole 51 to connect the first base body 1, the second base body 2, and the fifth base body 5 at one end in the same direction to each other rotatably in series. In a preferred embodiment of the present invention, the pivot shaft 14 may be only partially passing through the first pivot hole 111 on one side, so that the first pivot hole 111 reserves some space on one side for assembling a cable organizer 6, which will be described later.

Figure 4:
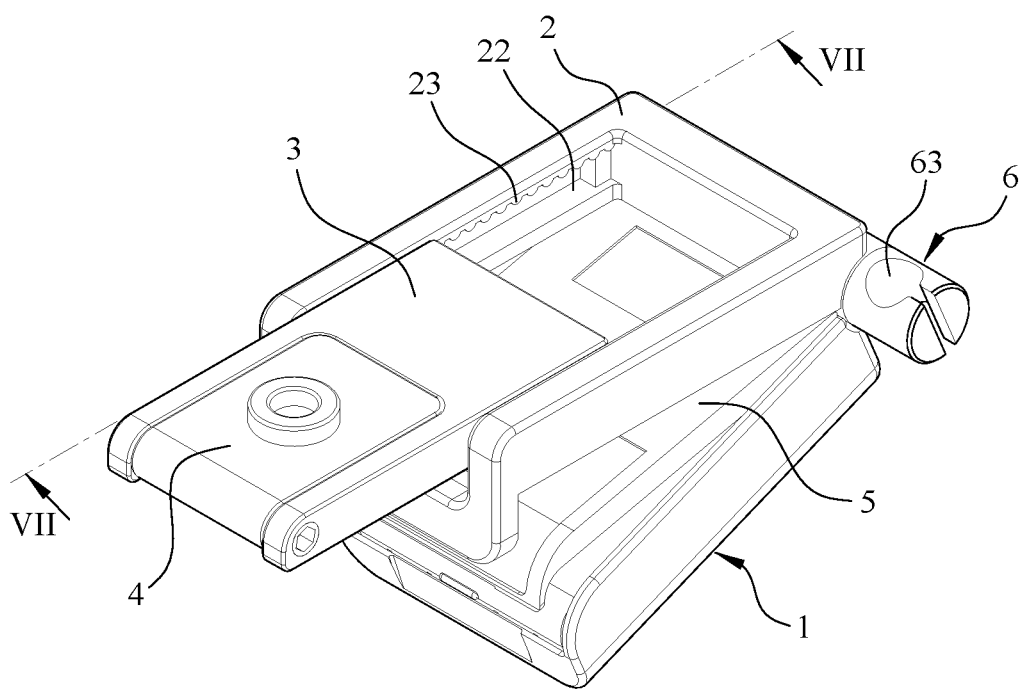
FIG. 4 is a perspective view showing an embodiment of the third base body shown in FIG. 1 sliding out of the second base body.
Figure 7:
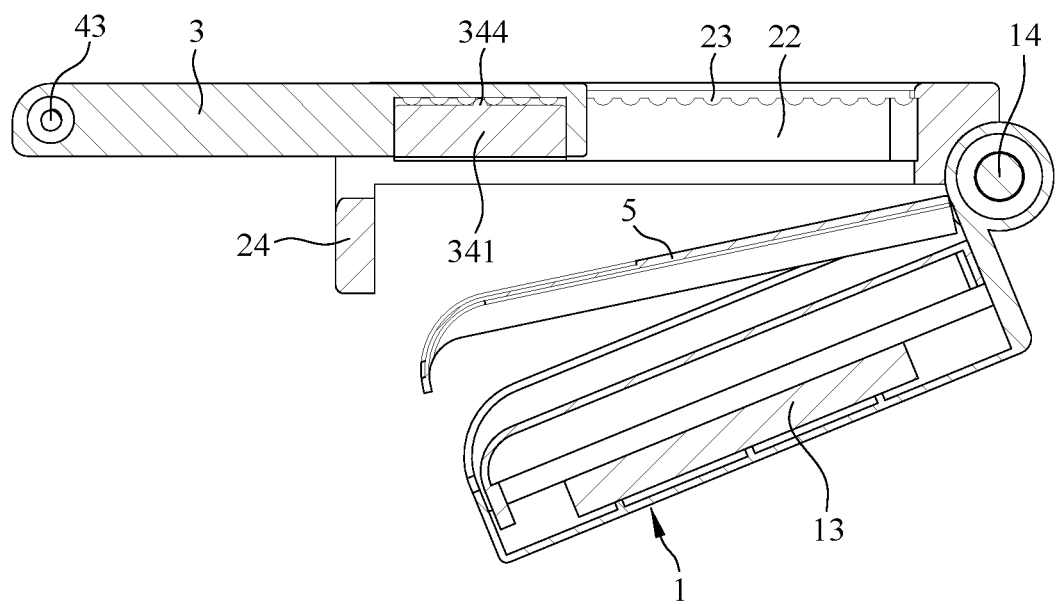
FIG. 7 is a cross-sectional view taken along line VII-VII of FIG. 4.

As shown in FIG. 3 and FIG. 4, the third base body 3 is a sliding element for the mount A, the third base body 3 is slidably coupled with the second base body 2, and can be slidably moved out of the second base body 2 or into the second base body 2. Specifically, two opposite outer sides of the third base body 3 are symmetrically formed with a slider 34 and the slider 34 is to match slidingly the rail groove 22 of the second base body 2. More specifically, one end of the third base body 3 is formed with a second notch 31 for assembly with the fourth base body 4. The second notch 31 is correspondingly provided with a third pivot hole 33 on two opposite sides close to the opening for rotatable connection with the fourth base body 4. A recess 32 for assembly with the slider 34 is formed under the other end of the third base body 3. A sliding portion 341 and a fixing portion 342 are respectively formed at opposite ends of the slider 34, a convex strip 344 is formed on the upper surface of the sliding portion 341, and the fixing portion 342 is disposed with a plurality of fixing holes 343. By using a plurality of fixing components, such as screws, to pass through the fixing holes 343, the fixing portions 342 of the two sliders 34 are locked to the screw holes in the recess 32 of the third base body 3 respectively, so that the sliding portion 341 protrudes from the two opposite sides of the third base body 3. When the third base body 3 is matched with the second base body 2, the third base body 3 is slid into the first notch 21 through the open end 210 of the first notch 21 of the second base body, and the sliding portion 341 on the side is slidably fitted to the two rail grooves 22 (as shown in FIG. 6 and FIG. 7). As such, during the sliding portion 341 sliding along the rail groove 22, the convex strip 344 and the tooth row 23 in the rail groove 22 rub against each other and have a positioning effect.

Figure 5:
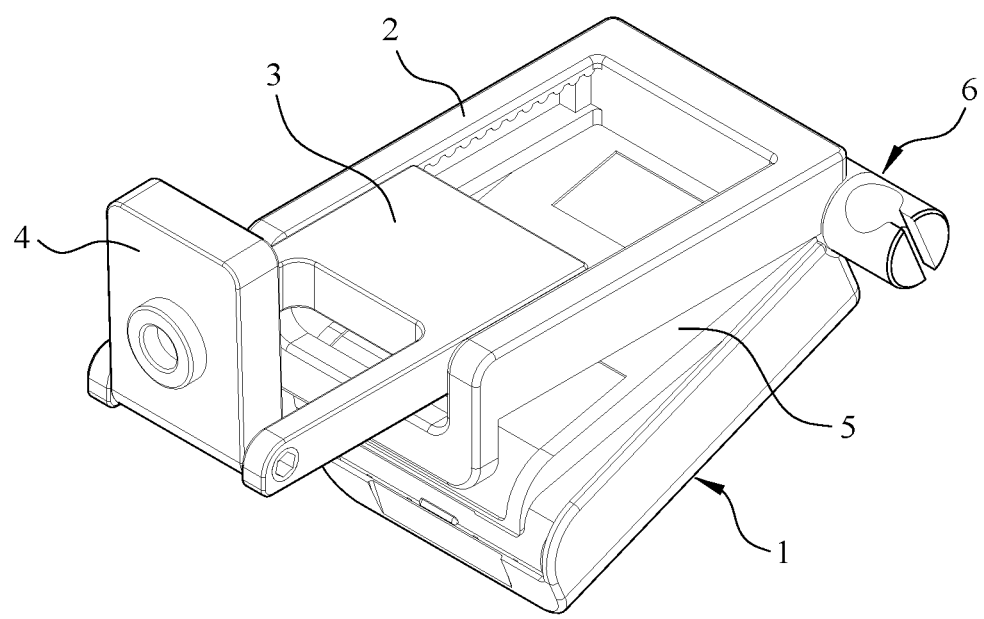
FIG. 5 is a perspective view showing an embodiment of the fourth base body shown in FIG. 4 rotated 90° relative to the third base body.

As shown in FIG. 3 and FIG. 5, the fourth base body 4 is used as a movable element of mount A, and the fourth base body 4 is used in combination with the installation portion 41 to install the webcam 8. The fourth base body 4 is rotatably assembled to the second notch 31 of the third base body 3. Specifically, one end of the fourth base body 4 is provided with a through hole 42 penetrating both sides, and a rotating shaft 43 passes through the through hole 42 and the third pivot holes 33 on two sides of the second notch to accomplish the rotatable connection between the fourth base body 4 and the third base body 3. Preferably, the thickness of the fourth base body 4 can be designed to meet the following: When the rotation angle of the fourth base body 4 relative to the third base body 3 is 0°, the fourth base body 4 is completely accommodated in the second notch 31, so that the fourth base body 4 and the third base body 3 are combined to appear as a whole. The rotation of the fourth base body 4 relative to the third base body 3 can be rotated in the range of at least 0°-90°, so as to adjust the top view angle of the webcam 8 installed on the fourth base body 4.

Moreover, the present invention also provides a cable organizer 6, and the cable organizer 6 is formed to have a cylindrical body 61 and a shaft portion 62 connected to the body 61, and the body 61 is provided with a radially penetrating wire hole 63, and an opening 64 communicating with the wire hole 63 is formed at the end of the body 61. The shaft portion 62 can be assembled in the first pivot hole 111 on one side of the lower shell 11 in an interference fit, so that the cable 81 of the webcam 8 can be inserted into the wire hole 63 through the opening 64 for neat arrangement after the webcam 8 is installed on the mount A.

The use of the multi-functional mount A for the webcam of the present invention is described as follows:

As shown in FIG. 8, the mount A is fixed on the upper side of the display 7 by the second base body 2 and the fifth base body 5, that is, the second base body 2 is placed on the upper side of the display 7, and the fifth base body 5 uses the arc-shaped free end 52 to abut against the back of the display 7. Under a normal usage, the third base body 3 is accommodated in the second base body 2, the first base body 1 used as the counterweight element can be rotated to adjust the angle according to the optimal balance, and the webcam 8 installed in the fourth base body 4 has the lens facing the user in front of the display 7.

Figure 9:
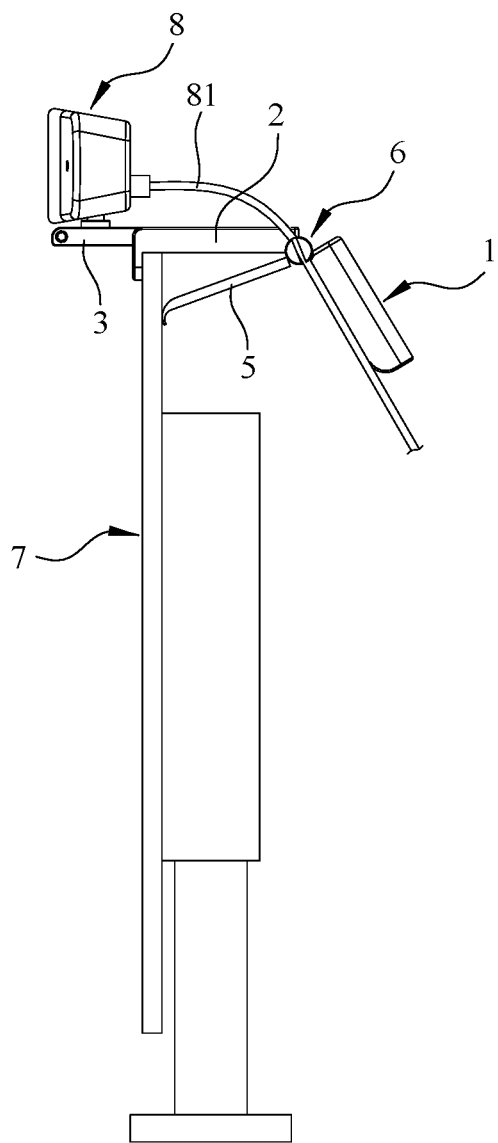
FIG. 9 shows the state in which the webcam shown in FIG. 8 is slid away from the display along with the third base body.
Figure 10:
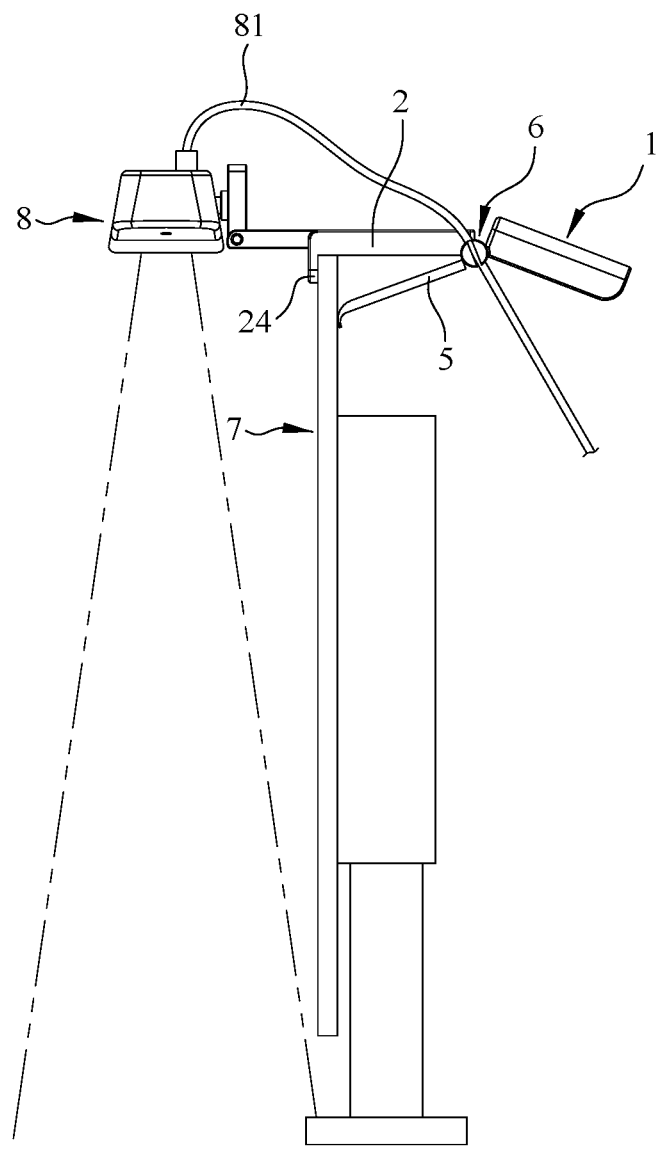
FIG. 10 shows the state after the webcam shown in FIG. 9 is rotated 90° along with the fourth base body.

When the webcam 7 needs to be turned to face the target on the table, the webcam 8 can be pulled to make the third base body 3 slide out of the second base body 2 (as shown in FIG. 9). In this state, the first base body 1 can be rotated by an appropriate angle to adjust the optimal center of gravity of the mount A according to actual balance requirements, so that the mount A can be stably arranged on the display 7. When the webcam 8 is used to obtain the image on the table, the webcam 8 will be moved downward to make the fourth base body 4 rotate 90° relative to the third base body 3, as shown in FIG. 10. Again, in this state, the first base body 1 can be rotated by an appropriate angle according to the actual balance needs to adjust the optimal center of gravity position of the mount A, so that the mount A can be stably arranged on the display 7. Moreover, since the webcam 78 is far away from the display 7, the lens will not capture the image of the screen of the display 7 even when the lens completely face directly to the table, and it can ensure that the image captured by the webcam 78 does not produce a trapezoidal image, so subsequent image correction is not required.

Figure 11:
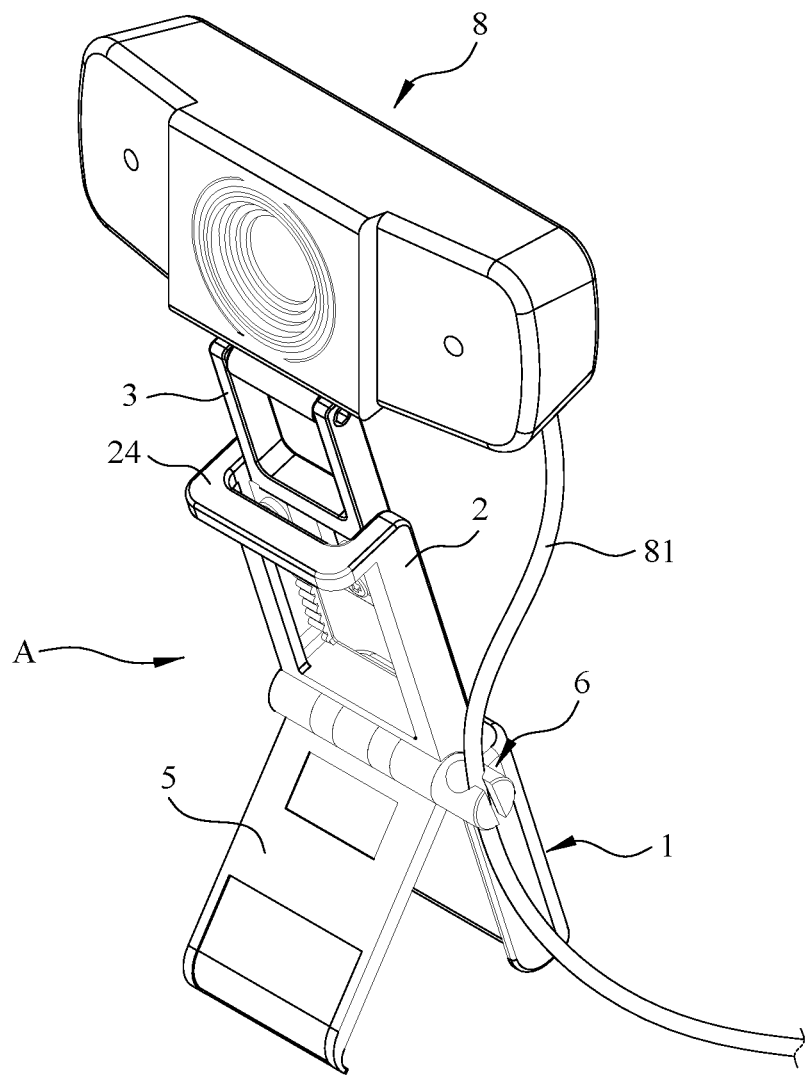
FIG. 11 shows a schematic view of a usage state with the mount directly placed on a table.

Moreover, as shown in FIG. 11, another feature of the present invention is that the user can also remove the mount A from the display 7, and unfold the first base body 1 and the fifth base body 5 to an appropriate included angle for serving as a support to place the mount A directly on the table, and the third base body 3 can slide relatively to the second base body 2 to adjust the height of the webcam 8. Likewise, the cable 81 connected to the webcam 8 can be passed through the wire holes 63 of the cable organizer 6 to avoid cluttering.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A multi-functional mount for a webcam, comprising:
a first base body;
a second base body, rotatably connected to the first base body;
a third base body, matched with and assembled on the second base body; and
a fourth base body, for connecting a webcam and rotatably connected to the third base body;
wherein, the first base body is provided with a counterweight block, making the weight of the first base body greater than the weight of any one of the second base body, the third base body, and the fourth base body;
a rotatable junction located somewhere between the first base body and the second base body and connected to a fifth base body so that the fifth base body is located between the first base body and the second base body;
the third base body is slidably matched and assembled to the second base body, the third base body slides relative to the second base body so that at least a part of the third base body is accommodated inside the second base body, or a part of the third base body extends out of the second base body;
the fourth base body is used for connecting the webcam, the fourth base body is rotatably connected to the third base body, and the fourth base body is rotatable within the range of at least 0°-90° relative to the third base body;
the second base body is formed with a first notch, opposite sides of the first notch are symmetrically formed with rail grooves respectively, and opposite two outer sides of the third base body are symmetrically respectively formed with a slider that is slidably matched with the rail groove;
a tooth row is formed on one side surface of the rail grooves, and a convex strip is formed on one side surface of the sliders; when the sliders slide along the rail grooves, the convex strips and the tooth rows rub against each other to create a positioning effect; and
the tooth row is formed on an upper surface of the rail grooves, opposite ends of the sliders are respectively formed with a fixing portion and a sliding portion, the convex strip is formed on an upper surface of the sliding portion, the fixing portion has a plurality of fixing holes, and a plurality of fixing elements fix the sliders to the third base body through the fixing holes.

2. The multi-functional mount for a webcam according to claim 1, wherein the first base body comprises:
a lower shell, having an inner space, and a convex column being formed on bottom surface of the inner space; and
an upper shell, matched with the lower shell to cover the inner space;
wherein, the counterweight block has a perforation, the counterweight is disposed in the inner space of the lower shell, and a protruding post passing through the perforation to position the counterweight block.

3. The multi-functional mount for a webcam according to claim 2, further comprising: a cable organizer connected to the side of the rotatable junction of the first base body, the cable organizer having a wire hole through which a power supply cable passes.

4. The multi-functional mount for a webcam according to claim 3, wherein:
one side of the lower shell is provided with a first pivot hole;
one side of the second base body is provided with a second pivot hole;
one side of the fifth base body is provided with a fifth pivot hole, the second pivot hole and the first pivot hole complete the rotatable junction through a pivot shaft; and
the cable organizer has a main body and a shaft portion connected to the main body, the shaft portion is assembled in the first pivot hole in an interference fit, and the wire hole penetrates the main body radially, with an opening formed at the end of the main body and communicating with the wire hole.

5. The multi-functional mount for a webcam according to claim 1, wherein a free end of the fifth base body opposite to the rotatable junction is formed as an arc edge, thereby when the mount is disposed on the display and the arc-shaped free end of the fifth base body is abutted against the display, a more stable support can be obtained.

6. The multi-functional mount for a webcam according to claim 1, wherein an extension portion is formed at an opening end of the first notch of the second base body, and an included angle is formed between the extension portion and the bottom surface of the second base body, the extension portion in combination with the fifth base body supports the mount to be stably mounted on top edge of a computer display.

* * * * *